United States Patent [19]

Inagaki et al.

[11] Patent Number: 5,717,299

[45] Date of Patent: Feb. 10, 1998

[54] APPARATUS FOR DRIVING A SENSORLESS MOTOR

[75] Inventors: Koichi Inagaki, Chiba; Noriaki Okada, Gunma, both of Japan

[73] Assignees: Sony Corporation, Tokyo; Sanyo Electric Co., Ltd., Osaka, both of Japan

[21] Appl. No.: 670,775

[22] Filed: Jun. 20, 1996

[30] Foreign Application Priority Data

Jun. 23, 1995 [JP] Japan ................................ 7-180966

[51] Int. Cl.$^6$ ........................................ H02P 6/18
[52] U.S. Cl. ........................ 318/254; 318/439; 318/721
[58] Field of Search ................................ 318/138, 254, 318/430, 431, 439, 705, 720–724

[56] References Cited

U.S. PATENT DOCUMENTS

| | | | |
|---|---|---|---|
| 4,874,993 | 10/1989 | Tanaka et al. | 318/254 |
| 5,223,772 | 6/1993 | Carobolante | 318/254 |
| 5,572,097 | 11/1996 | Cameron | 318/254 |

Primary Examiner—Bentsu Ro
Attorney, Agent, or Firm—William S. Frommer; Alvin Sinderbrand

[57] ABSTRACT

A brushless sensorless motor driving circuit for driving a motor having a rotatable rotor and a plurality of excitation coils in which a motor starting mode may be smoothly switched to a normal driving mode so as to reduce a fluctuation in a starting time. The sensorless motor driving circuit includes a detection circuit for detecting a generated induction voltage from the excitation coils; a phase-locked loop circuit for generating a clock pulse; a delay pulse generating circuit for generating a delay pulse based on the clock pulse; a switching signal generating circuit for generating conduction switching signals in accordance with the delay pulse and an output signal from the detection circuit for causing an excitation pattern of the excitation coil to be switched to another excitation pattern; and starting pulse inserting circuits for inserting a starting pulse based on the clock pulse in the detection circuit when the induction voltage is not generated.

17 Claims, 8 Drawing Sheets

APPARATUS FOR DRIVING A SENSORLESS MOTOR

BACKGROUND OF THE INVENTION

The present invention relates to a brushless sensorless motor driving circuit.

A brushless sensorless motor driving circuit may be utilized to drive a 2-phase brushless motor or the like. Such 2-phase brushless motor driving circuit does not use a rotation detecting sensor or element (such as a Hall effect element or the like) to detect the rotation of a rotor of the motor. Instead, such 2-phase brushless sensorless motor driving circuit may utilize induced voltages (counterelectromotive forces) generated in driving or excitation coils. More particularly, this brushless sensorless motor driving circuit detects induced voltages generated in the excitation coils and switches the excitation or driving current of the 2-phase excitation coils by delaying the timing by a predetermined amount at which the polarity is inverted. Furthermore, in this brushless sensorless motor driving circuit, a spike voltage (flyback voltage) generated when the excitation pattern is changed-over may be eliminated by a filter or other similar device.

In the above-described brushless sensorless motor driving circuit, a starting pulse may be generated and utilized to cause the rotor to begin rotating. For example, consider the situation in which the rotor is placed at a correct stop position (referred to as a "reference position") and the rotor is not energized or rotated immediately after the excitation coils are excited. In such situation, if induced voltages generated in the excitation coils cannot be detected within a predetemined period of time, then a starting pulse is generated. As a result, the excitation pattern of the excitation coils is switched to the next excitation pattern by the generated starting pulse, thereby causing the rotor to begin rotating.

Figure 7:
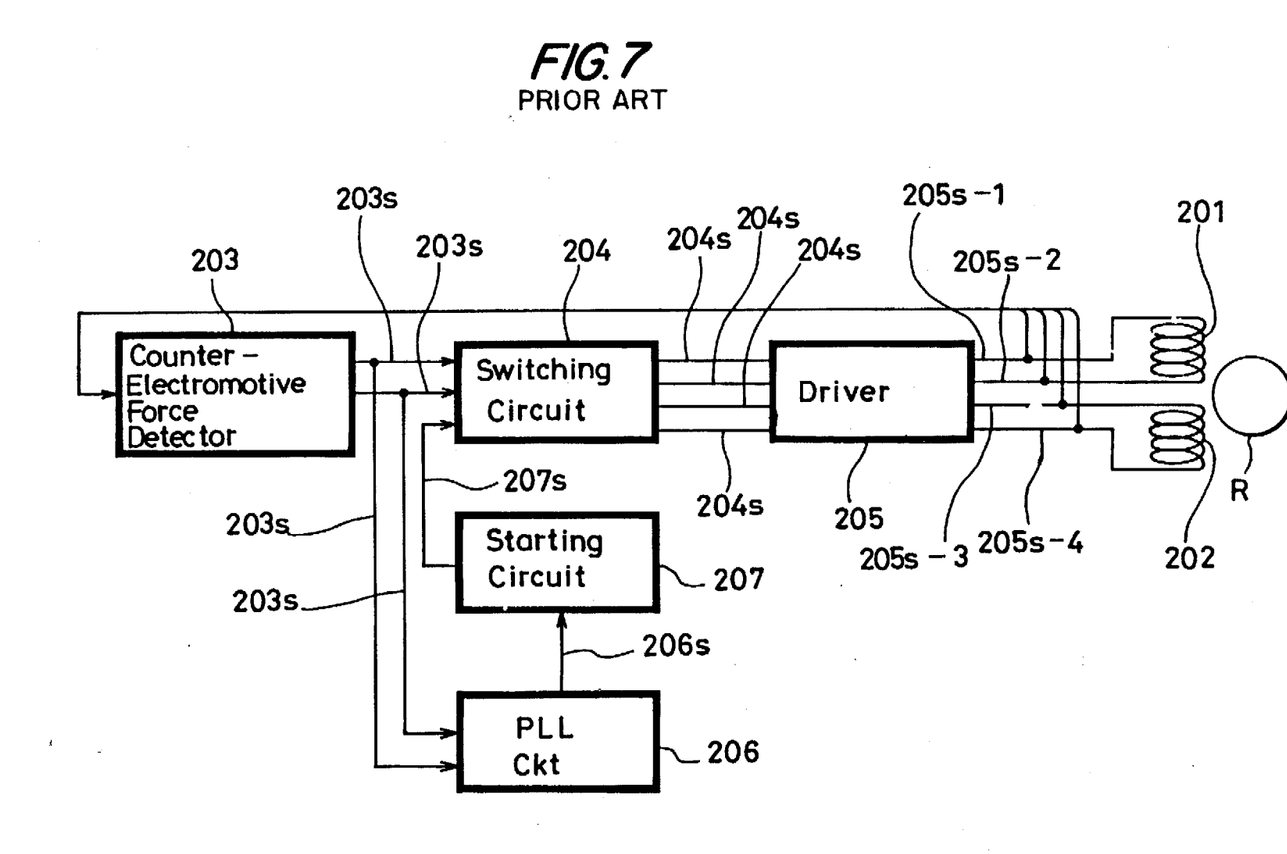
FIG. 7 is a diagram of a brushless sensorless motor driving circuit to which reference will be made in explaining the background of the invention.

A 2-phase bipolar brushless sensorless motor driving circuit is illustrated in FIG. 7. Such driving circuit generally includes a counter-electromotive force detector 203, a switching circuit 204, a driver circuit 205, a phase-synchronization or phase-locked loop (PLL) circuit 206 and a starting circuit 207 which are coupled as shown in FIG. 7. Such driving circuit may be utilized with a motor having a rotor R.

In operation, when the rotor R is rotated, two-phase excitation coil 201 or 202 generates counterelectromotive forces 205s-1 through 205s-4. The counterelectromotive forces 205s-1 through 205s-4 are supplied to the counter-electromotive force detector 203 which compares such counterelectromotive forces and provides a compared signal (s) 203s. The compared signals 203s are supplied to the switching circuit 204. Output signals 204s from the switching circuit 204 are supplied to the driver circuit 205, whereupon such signals are amplified and supplied to the excitation coils 201, 202.

The compared signal 203s is further supplied to the PLL circuit 206, wherein it is processed or multiplied so as to generate an internal clock signal 206s which is supplied to the starting circuit 207. In certain situations, the starting circuit 207 may generate a starting pulse which may be utilized to cause the rotor to rotate. That is, when the electromotive forces 205s-1 through 205s-4 are not generated from the excitation coils 201 and 202, the starting circuit 207 is switched from a stop mode to a starting mode. In such starting mode, the starting circuit 207 may utilize the internal clock signal 206s, such as by counting pulses thereof, to form a starting pulse signal 207s which is supplied to the switching circuit 204. As a result, the switching circuit 204 effects a two-phase switching so as to switch the excitation pattern of the excitation coils 201 and 202 to the next excitation pattern, thereby causing the rotor R to be rotated.

Thus, in the above-described brushless sensorless motor driving circuit, the rotor R is rotated immediately after the two-phase excitation coil 201 or 202 is excited, whereupon the counterelectromotive forces 205s-1 through 205s-4 generated in the excitation coils 201, 202 are detected. Further, the excitation is switched by delaying a so-called zero-crossing timing of the counterelectromotive force by a predetermined amount of time. When the zero-crossing point of the electromotive force cannot be detected within a predetermined period of time, the starting circuit 207 is energized or utilized so as to prevent the rotor R from being deenergized immediately after the excitation coils 201, 202 are excited. In particular, the starting circuit 207 generates the starting pulse 207s which forces the excitation pattern of the excitation coils 201, 202 to be switched to the next excitation pattern. Due to such switching of the excitation pattern, the rotor R is rotated which causes an counterelectromotive force in the excitation coils 201, 202 to be generated.

The above brushless sensorless motor driving circuit is switched from the starting mode to a normal motor driving mode when a predetermined condition is satisfied after the zero-crossing point(s) of the counterelectromotive forces 205s-1 to 205s-4 of the excitation coils 201, 202 have been detected. Numerous conditions may be utilized for such predetermined condition. For example, when a zero-crossing and a frequency or phase of the starting clock correspond may be utilized as the predetermined condition.

Problems may arise during certain operations of the above brushless sensorless motor driving circuit. For example, consider the situation wherein immediately after the rotor R starts rotating in one direction the rotor R is rotated in the opposite direction and the above-described predetermined condition is not satisfied within a relatively long period of time. In this situation, several steps may be needed for the rotor R to be rotated in the opposite direction. As a result, the motor starting time and the rotor R starting time may fluctuate. Therefore, the starting performance of the rotor R may be affected depending upon the condition which is set or utilized for switching the brushless sensorless motor driving circuit from the starting mode to the normal motor driving mode. Such brushless sensorless motor driving circuit could be revised so as to enable switching from the starting mode to the normal motor driving mode to occur with a relatively high accuracy. However, as is to be appreciated, such revised driving circuit would require additional elements and/or circuits which could increase the complexity and/or cost of the driving circuit.

OBJECTS AND SUMMARY OF THE INVENTION

An object of the present invention is to provide a brushless sensorless motor driving circuit which enables the motor starting mode to be smoothly switched to the normal motor driving mode so as to decrease fluctuations in the starting time.

Another object of the present invention is to provide a brushless sensorless motor driving circuit as aforesaid which is relatively inexpensive.

In accordance with a first aspect of the present invention, a sensorless motor driving circuit for driving a motor having a rotatable rotor and a plurality of excitation coils is provided. The driving circuit comprises a detection device for detecting a reference position of the rotor based on induction voltage of the excitation coils; a phase-locked loop circuit for generating a clock pulse; a delay pulse generating circuit for generating a delay pulse based on the clock pulse; a switching signal generating device for generating conduction switching signals for the excitation coils from an output signal of the detection device based on the timing of the delay pulse from the delay pulse generating device; a driver circuit for causing conduction in the excitation coils based on the conduction switching signals; and starting pulse inserting circuits for inserting a starting pulse based on the clock pulse in the detection device when the induction voltage is not generated from the plurality of excitation coils.

The sensorless motor driving circuit may be used with a 2-phase bi-directional sensorless motor which rotates a drum of a rotary magnetic head apparatus. Alternatively, the sensorless motor driving circuit may be used with a 2-phase bi-directional sensorless motor which rotates an optical disk.

The detection device of the sensorless motor driving circuit may include comparing circuits which are coupled to the plurality of excitation coils for comparing each induction voltage of the excitation coils. The phase-synchronization or locked loop circuit (PLL circuit) may include a frequency-divide circuit for frequency-dividing the clock pulse signal and a phase comparator which compares the frequency-divided pulse with a differentiation pulse. The delay pulse generated by the delay pulse generating circuit may be delayed by a predetermined delay time from the reference position by counting clock pulses supplied thereto from the PLL circuit. The excitation switching signals generated by the switching signal generating device are used to force the excitation pattern of the excitation coils to be switched to the next excitation pattern. The starting pulse inserting circuits may include (i) a switching device operative for being placed in one of an active state and an inactive state in response to the clock pulse supplied thereto from the phase-locked loop circuit, and (ii) an unbalanced voltage supplying unit responsive to the switching device and coupled to the comparing circuits at a portion thereof which is connected to the plurality of excitation coils for supplying a first unbalanced voltage to the comparing circuits when the switching device is placed in the inactive state and for supplying a second unbalanced voltage to the comparing circuits when the switching device is placed in the active state. The unbalanced voltage supplying unit may include a plurality of resistors.

The sensorless motor driving circuit may include a differentiation pulse generating device which is adapted to generate a differentiation pulse based on an output signal from the detection device.

When any one or more of the excitation coils are excited to generate a magnetic force and the rotor is rotated by such magnetic force, the detection device detects and compares the counterelectromotive forces supplied thereto from the excitation coil(s). Based on the induced voltages generated in the excitation coils, the detection device detects or determines the reference position of the rotating rotor. The reference position may be defined as a position at which voltages induced in the excitation coils when the rotor is rotated pass a zero-crossing point.

If the rotor is attracted by a magnetic force and placed in a stationary or neutral position, then even when a plurality of excitation coils are excited the rotor may not be rotated and, as such, an induced voltage is not generated. In this situation, the starting pulse inserting circuits insert a motor starting pulse (obtained from the frequency-divided clock pulses from the PLL circuit) into the comparing circuits of the detection device. As a result, the switching signal generating device generates the excitation switching signal (s) for the excitation coils so as to cause the excitation pattern of the excitation coils to be switched to the next excitation pattern. Thus, as described above, the analog starting or driving pulse inserting circuits insert motor driving pulses into the comparing circuits of the detection device when the excitation coils do not generate counterelectromotive forces.

The switching device may be placed in either the inactive or active state in response to the starting or clock pulse signal so as to cause either the first or second unbalanced voltage to be supplied to the comparing circuits. (As a result, the comparing circuits are respectively placed in either a first unbalanced voltage state or a second unbalanced voltage state.) When the switching device is switched from the inactive state to the active state, the second unbalanced voltage is supplied to the comparing circuits, whereupon a compared signal produced by the comparing circuits may be changed or switched. At this time, if the rotor is placed in the neutral position, the rotor does not begin to rotate and counterelectromotive forces are not generated even when the excitation coils are excited. As such, the excitation pattern of the excitation coils needs to be switched. In this situation, the starting pulse is used both as a starting pulse and the pulse for the frequency-dividing circuit of the PLL circuit.

The first and second unbalanced voltages may have values considerably smaller than those corresponding to the counterelectromotive forces generated when the rotor is rotated. Accordingly, superimposing the unbalanced voltages on the counterelectromotive forces produces a negligible change thereof and, as a result, the brushless sensorless motor driving circuit may be smoothly switched from the starting mode to the normal motor driving mode. In other words, since a starting pulse from the starting pulse inserting circuit does not significantly change or disturb generated counterelectromotive forces, switching from the starting mode to the normal motor driving mode of the brushless sensorless motor driving circuit may be smoothly or efficiently accomplished.

Other objects, features and advantages according to the present invention will become apparent from the following detailed description of an illustrated embodiment when read in conjunction with the accompanying drawings in which corresponding components are identified by the same reference numerals.

BRIEF DESCRIPTION OF THE DRAWINGS

FIGS. 5A–5R are diagrams of signals to which reference will be made in explaining the operation of the brushless sensorless motor driving circuit of FIG. 1;

DESCRIPTION OF THE PREFERRED EMBODIMENT

A preferred embodiment of the present invention will now be described with reference to the accompanying drawings.

Figure 1:
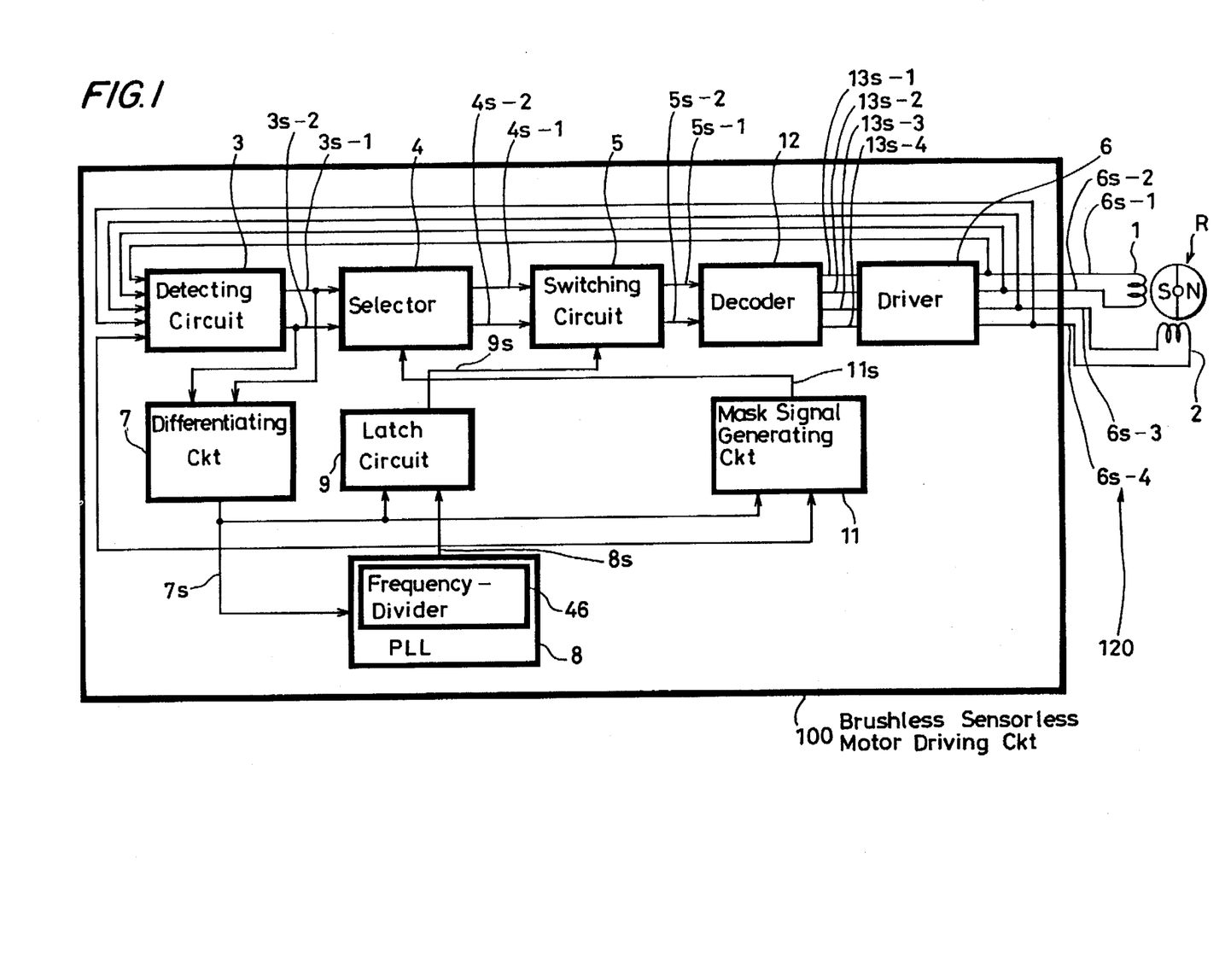
FIG. 1 is a diagram of a brushless sensorless motor driving circuit according to a preferred embodiment of the present invention.

FIG. 1 illustrates a brushless sensorless motor driving circuit 100 which is adapted to drive a brushless sensorless motor 120. The driving circuit 100 generally includes a detecting circuit 3, a selector 4, a switching circuit 5, a driver circuit 6, a differentiating circuit 7, a phase-locked loop (PLL) circuit 8, a latch delay circuit 9, a mask signal generating circuit 11 and a decoder 12 which are connected as shown in FIG. 1.

The brushless sensorless motor 120 may be a 2-phase bipolar excitation type brushless sensorless motor or similar type of motor. As shown in FIG. 1, the brushless sensorless motor 120 includes two driving or excitation coils 1 and 2 and a rotor R having an N pole and an S pole. As a result of the rotor rotating, induced voltages or so-called counterelectromotive forces may be produced or generated in the driving coils 1 and 2. In particular, the driving coil 1 produces or generates counterelectromotive forces 6s-1, 6s-2, and the driving coil 2 generates counterelectromotive forces 6s-3, 6s-4.

The brushless sensorless motor 120 may be utilized in a number of applications. For example, such motor may rotate a rotary drum of a rotary magnetic head device of a video and/or audio apparatus such as a VCR (not shown), or may rotate an optical disk of an optical disk apparatus (not shown).

The counterelectromotive forces generated in the 2-phase driving coil 1 or 2 in accordance with the revolution of the rotor R may be supplied to the detecting circuit 3, whereupon a reference position of the rotating rotor R may be detected. Such reference position of the rotor R may represent a position of the rotor R relative to the driving coils 1 and 2 when the voltages induced in the driving coils pass a zero-crossing point. (Such zero-crossing point is more fully described hereinafter.)

Figures 5A, 5B, 5C, 5D, 5E, 5F, 5G, 5H, 5I, 5J:
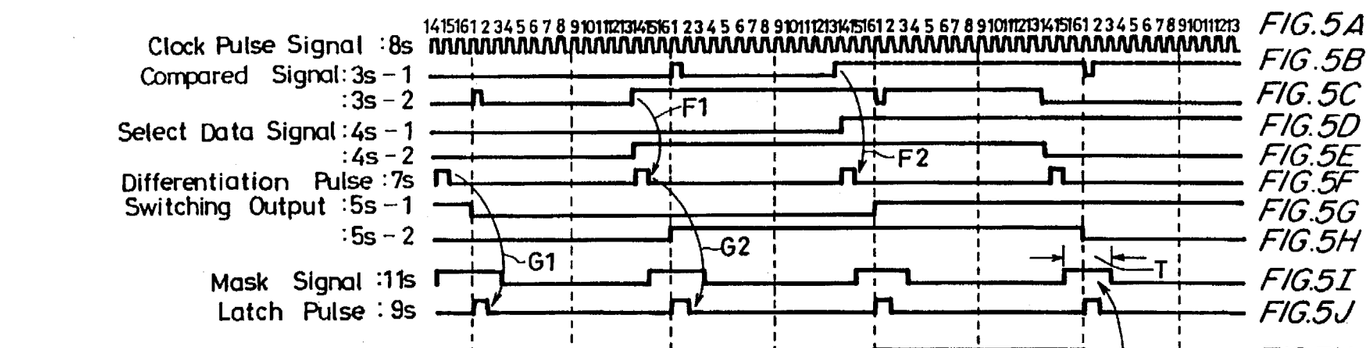
Figures 5K, 5L, 5M, 5N:
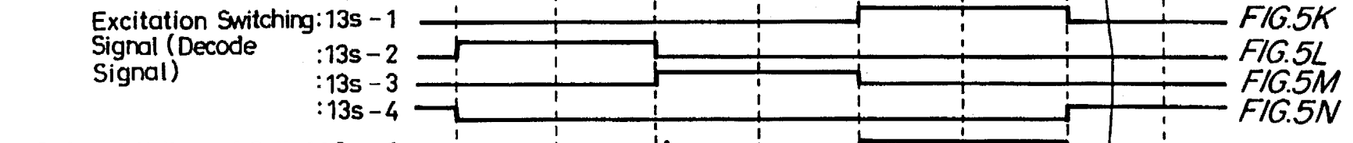
Figures 5O, 5P:
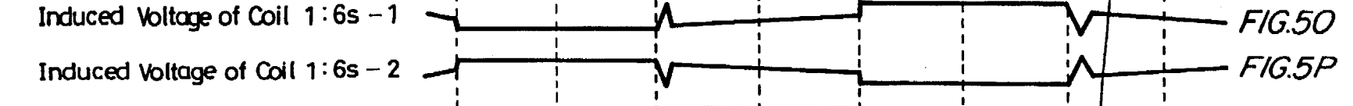
Figures 5Q, 5R:
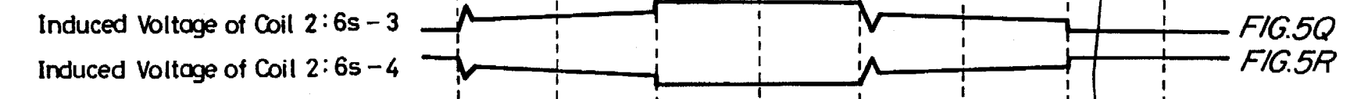

The detecting circuit 3 receives the induced voltages or counterelectromotive forces from the driving coils 1 and 2 along with a clock pulse 8s from the PLL circuit 8, as hereinafter more fully described, and produces compared signals 3s-1 and 3s-2 therefrom. An example of such compared signals is illustrated in FIGS. 5B and 5C. The compared signals 3s-1 and 3s-2 may be supplied to the selector 4 and the differentiating circuit 7.

The selector 4 is adapted to receive the compared signals 3s-1 and 3s-2 from the detecting circuit 3 and a mask signal 11s from the mask signal generating circuit 11 as hereinafter more fully described. Based upon such received signals, the selector forms selected data signals 4s-1 and 4s-2 which are supplied to the switching circuit 5. An example of such selected data signals 4s-1 and 4s-2 is illustrated in FIGS. 5D and 5E.

The switching circuit 5 is adapted to receive the selected data signals 4s-1 and 4s-2 from the selector 4 and a latch delay pulse 9s from the latch delay circuit 9 as hereinafter more fully described. Based upon the received signals/pulses, the switching circuit provides switching output signals 5s-1 and 5s-2 which are supplied to the decoder 12. An example of such switching output signals is illustrated in FIGS. 5G and 5H.

The decoder 12 is adapted to receive the switching output signals 5s-1 and 5s-2 and to decode such signals in accordance with a predetermined technique so as to form decoded or excitation switching signals 13s-1, 13s-2, 13s-3 and 13s-4 which are supplied to the driver circuit 6. An example of such signals is illustrated in FIGS. 5K, 5L, 5M and 5N.

Figure 8:
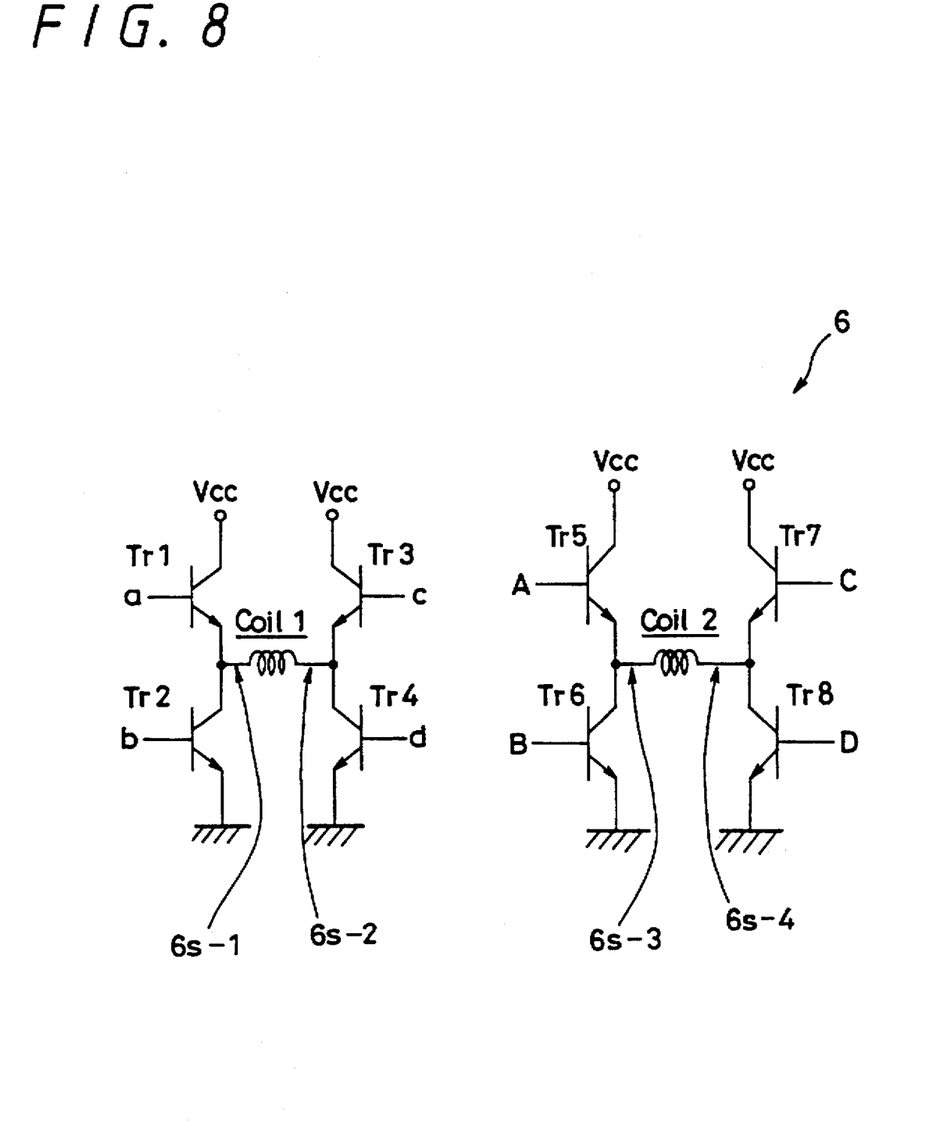
FIG. 8 is a diagram of a driver circuit used in the brushless sensorless motor driving circuit of FIG. 1.

The driver circuit 6 is adapted to receive the signals 13s-1 to 13s-4 and, in response thereto, to cause the coil or coils to be excited. The driver circuit 6 may include a switching circuit such as that illustrated in FIG. 8. As shown therein, such switching circuit may include a plurality of transistors for each of the coils 1, 2. More specifically, transistors Tr1, Tr2, Tr3 and Tr4 may be utilized for coil 1, and transistors Tr5, Tr6, Tr7 and Tr8 may be utilized for coil 2. These transistors are arranged as shown in FIG. 8 and may be switched "on" in response to the signals 13s-1 to 13s-4 so as to cause a respective coil(s) to be excited. For example, transistors Tr1 and Tr4 may be switched on when the signal 13s-1 has a relatively high value and, as a result, the driver circuit 6 may cause the driver coil 1 to be excited. Similarily, transistors Tr2 and Tr3 may be switched on when the signal 13s-2 has a relatively high value whereupon the driver circuit causes the driver coil 1 to be excited; transistors Tr5 and Tr8 may be switched on when the signal 13s-3 has a relatively high value whereupon the driver circuit causes the driver coil 2 to be excited; and transistors Tr6 and Tr7 may be switched on when the signal 13s-4 has a relatively high value whereupon the driver circuit causes the driver coil 2 to be excited. An indication of such switching arrangement is provided at the bottom of FIG. 5.

The differentiating circuit 7 is adapted to receive the compared signals 3s-1 and 3s-2 and to generate a differentiation pulse 7s therefrom when either one of the compared signals is inverted in polarity. An example of such differentiation pulse signal 7s is illustrated in FIG. 5F (also see arrows F1 and F2 in FIGS. 5B, 5C and 5F). In other words, the differentiating circuit 7 generates the differentiation pulse 7s when one of the counterelectromotive forces of the 2-phase driving coils 1 and 2 pass a zero-crossing point (ZC), such as that illustrated in FIG. 3. The differentiation pulse 7s is supplied to the PLL circuit 8, the latch circuit 9 and the mask signal generating circuit 11.

The PLL circuit 8 is adapted to receive the differentiation pulse 7s and, in accordance therewith, generate the clock pulse signal 8s. In particular, such clock pulse signal may be generated in synchronism with the differentiation pulse 7s and a predetermined number of clock pulses may be generated for every differentiation pulse 7s as, for example, illustrated in FIG. 5A. As shown therein, 16 clock pulses are generated for every differentiation pulse 7s. The generated clock pulse signal 8s is supplied to the detecting circuit 3, the latch delay circuit 9 and the mask signal generating circuit 11.

Figure 4:
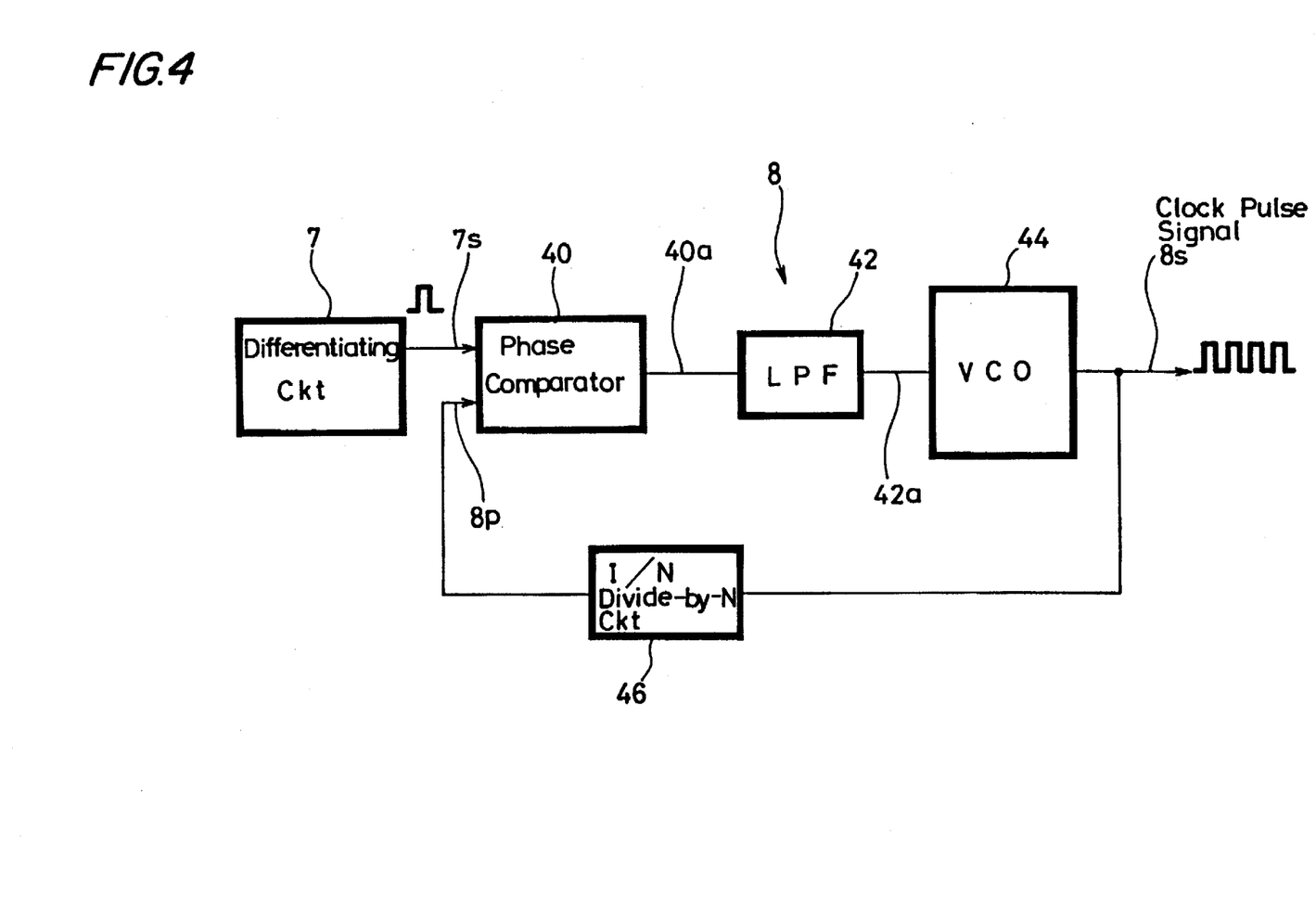
FIG. 4 is a diagram of a PLL circuit used in the brushless sensorless motor driving circuit of FIG. 1.

An example of the PLL circuit 8 is illustrated in FIG. 4. Such PLL circuit 8 includes a phase comparator 40, a low-pass filter 42, a voltage-controlled oscillator (VCO) 44 and a divide-by-N circuit 46 which are connected as shown in FIG. 4. The phase comparator 40 receives the differentiation pulse 7s from the differentiating circuit 7 and an output signal or pulse 8p from the divide-by-N circuit 46.

The phase comparator 40 compares the received pulses or signals and generates a comparison signal 40a therefrom which is supplied to the low-pass filter 42. The low-pass filter 42 is adapted to pass a frequency component or components of the comparison signal 40a having a frequency less than a predetermined value so as to form a voltage or output signal 42a. Such output signal 42a is supplied to the VCO 44, whereupon the clock pulse signal 8s is generated with a frequency corresponding to the output signal 42a. Such generated clock pulse 8s is outputted from the PLL circuit 8 and is supplied to the divide-by-N circuit 46. The divide-by-N circuit 46 divides the clock pulse 8s so as to provide a signal 8p having a frequency of 1/N that of the clock pulse. As an example, the signal 8p provided by the divide-by-N circuit 46 may have a frequency 1/16 of the clock pulse 8s. Such signal or pulse 8p is supplied to the phase comparator 40.

As a result, the clock pulse 8s may be oscillated by the VCO 44 at a frequency of nearly 16 times that of the differentiation pulse 7s. Furthermore, the VCO 44 may generate the clock pulse signal 8s with a relatively high frequency when the output signal 42a from the low-pass filter 42 has a relatively high voltage, and may generate the clock pulse signal 8s with a relatively low frequency when the output 42a has a relatively low voltage.

Returning to FIG. 1, the latch delay circuit 9 receives and, based upon such received signals, generates a latch delay pulse 9s having a predetermined delay. To determine such predetermined delay, the latch delay circuit 9 may utilize a counter or similar device to count pulses in the clock pulse signal 8s. As an example, the latch delay pulse 9s may have a delay time corresponding to three clock pulses from the differentiation pulse 7s as indicated by arrows G1 and G2 in FIGS. 5F and 5J. Furthermore, such latch delay pulse 9s may be delayed with a predetermined delay time from the reference position of the rotor R. The latch delay pulse 9s is supplied to the switching circuit 5.

The mask signal generating circuit 11 receives the clock pulse signal 8s and the differentiation pulse signal 7s and, based upon such received signals, generates a mask signal 11s. Such mask signal 11s may be held in a relatively high or on-state for a predetermined time period T and may remain therein until a predetermined event has occurred. For example, the mask signal 11s may remain in the on-state until a predetermined time has passed since the latch delay pulse 9s formed after the differentiation pulse 7s has been generated such as shown in FIG. 5i. The mask signal 11s is supplied from the mask signal generating circuit 11 to the selector 4.

Figure 3:
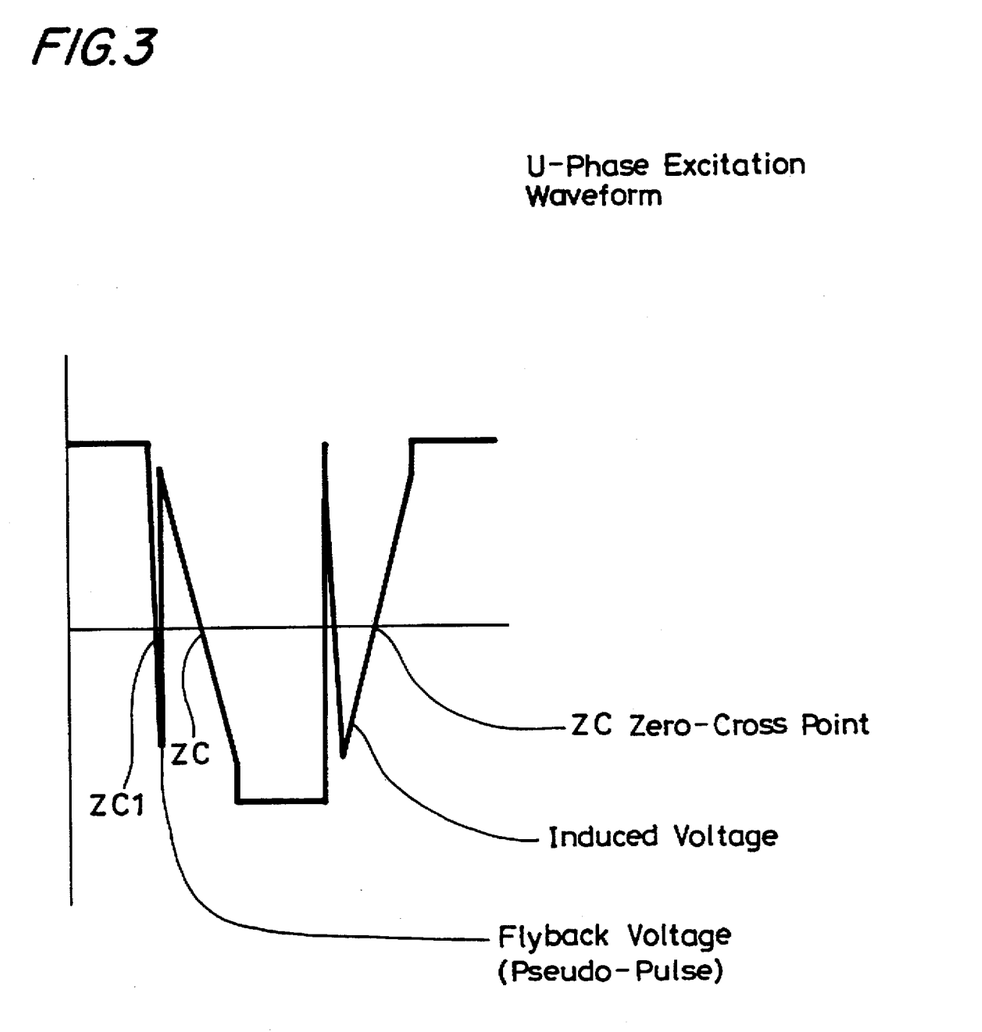
FIG. 3 is a diagram of an excitation waveform, a flyback voltage and a zero-crossing point obtained when the excitation is changed to which reference will be made in explaining the operation of the brushless sensorless motor driving circuit of FIG. 1.

The mask signal generating circuit 11 prevents a zero-crossing point, such as ZC1 (FIG. 3), from being inputted to a logic circuit (not shown) of the selector 4. Such zero-crossing point may be caused by a counterelectromotive force waveform generated as a result of switching the current flow to the driving coil 1 with respect to the excitation waveform of the driving coil 1 which corresponds to a U-phase (as illustrated in FIG. 3). In other words, the period T of the mask signal 11s may be considered a pseudo-pulse suppressing period T wherein a pseudo-pulse or flyback voltage (shown in FIG. 3) which may be generated when the excitation of the driving coils 1, 2 is switched can be suppressed.

Thus, the mask signal generating circuit 11 masks the zero-crossing point ZC1 so as to eliminate the counterelectromotive force or flyback voltage which may result from the switching of the driving coils 1, 2. This processing is performed because the zero-crossing point ZC1 is generated regardless of the rotation of the brushless sensorless motor 120.

An embodiment of the detecting circuit 3 will now be described with reference to FIG. 2.

Figure 2:
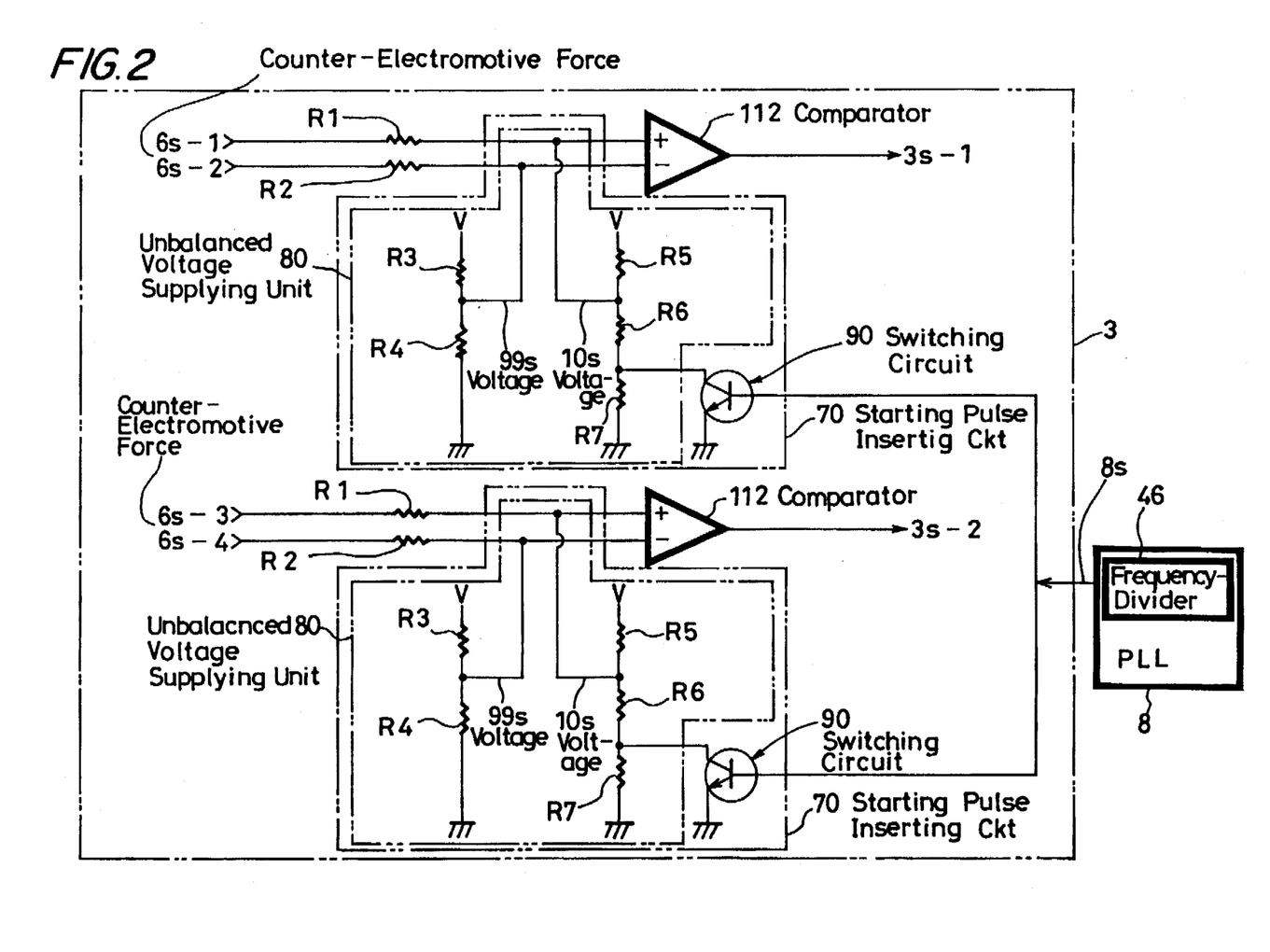
FIG. 2 is a diagram of a detecting circuit used in the brushless sensorless motor driving circuit of FIG. 1.

As shown in FIG. 2, the detecting circuit 3 may include comparators 112, 112 and starting pulse inserting circuits 70, 70 each of which includes an unbalanced voltage supplying unit 80 and a switching circuit 90. The starting pulse inserting circuits 70, 70, which may be analog circuits, are operative in response to the outputs of the comparators 112, 112 as hereinafter more fully described.

Plus and minus input terminals of the comparators 112, 112 are respectively coupled through resistors R1 and R2 to the excitation coils 1, 2. (Each of these resistors may have a resistance value of 10 kiloohms.) As such, one of the comparators 112 receives the counterelectromotive force signals 6s-1 and 6s-2 by way of resistors R1 and R2 and compares such received signals so as to obtain the compared signal 3s-1 (FIG. 5B) which is supplied therefrom. Similarly, the other comparator 112 receives the counterelectromotive force signals 6s-3 and 6s-4 by way of resistors R1 and R2 and compares such received signals so as to obtain the compared signal 3s-2 (FIG. 5C) which is supplied therefrom. In addition to the counterelectromotive force signals, the comparators 112, 112 may also receive voltages from the unbalanced voltage supplying units 80, 80 as hereinbelow described.

Since each of the starting pulse inserting circuits 70 is substantially the same, only one such circuit and, in particular, the elements contained therein will be described hereinbelow. However, as is to be appreciated, such description also applies to the other circuit 70.

The switching device 90 may include a transistor, such as an NPN transistor, having an active and an inactive state. This transistor is arranged between the PLL circuit 8 and the unbalance voltage supplying unit 80 such that the base of the transistor is coupled to the PLL circuit 8, the emitter of the transistor is coupled to ground and the collector of the transistor is coupled to the unbalance voltage supplying unit 80.

The unbalanced voltage supplying unit 80 may be a resistor-bridge type circuit having a plurality of resistors, such as five resistors R3 through R7 which are connected as shown in FIG. 2. As an example, the resistors R3 and R4 may each have a resistance value of 100 kiloohms, the resistor R5 may have a resistance value of 95 kiloohms, the resistor R6 may have a resistance value of 90 kiloohms, and the resistor R7 may have a resistance value of 10 kiloohms. The unbalanced voltage supplying unit 80 is coupled to the transistor/switching circuit 90 and the comparator 112. In particular, a junction between resistors R6 and R7 is coupled to the collector of the transistor, a junction between the resistors R5 and R6 of the unbalanced voltage supplying unit 80 is coupled to a junction between the resistor R1 and the plus input terminal of the comparator 112, and a junction between the resistors R3 and R4 of the unbalanced voltage supplying unit 80 is coupled to a junction between the resistor R2 and the minus input terminal of the comparator 112.

Upon receipt of the clock pulse signal 8s from the PLL circuit 8, the switching device/transistor 90 may be activated. That is, the switching device 90 may be changed from the inactive state to the active state in response to the clock or starting pulse 8s. As a result, the switching device or transistor supplies a signal to the unbalanced voltage supplying unit 80 so as to change the unbalanced voltage supplying unit from the state wherein a first unbalanced voltage is supplied to the comparator 112 to the state wherein a second unbalanced voltage is supplied to the comparator 112.

When the rotor R (FIG. 1) is in a stationary state and the switching device 90 is in an inactive state, a voltage 10s may be slightly higher than a voltage 99s. Such voltage condition or state (i.e., the voltage 10s being slightly higher than the voltage 99s) is referred to as a "first unbalanced voltage state". The first unbalanced voltage (voltage 10s—voltage 99s) is preferably slightly higher than both the offset standard of the comparator 112 and a noise level of the input portion of the comparator 112. As such, this unbalanced voltage may function as a hysteresis for the comparator 112, and can prevent malfunctions of the comparator 112 due to noise.

When the rotor R is switched from the stationary mode to the starting mode and the starting pulse 8s from the PLL circuit 8 is supplied to the switching device 90, the switching device is switched from the inactive state to the active state in response to the starting pulse. In this situation wherein the switching device 90 is in the active state, the voltage 10s may be lower than the voltage 99s. A condition or state wherein the voltage 10s is lower than the voltage 99s is referred to as a "second unbalanced voltage state".

Figure 6:
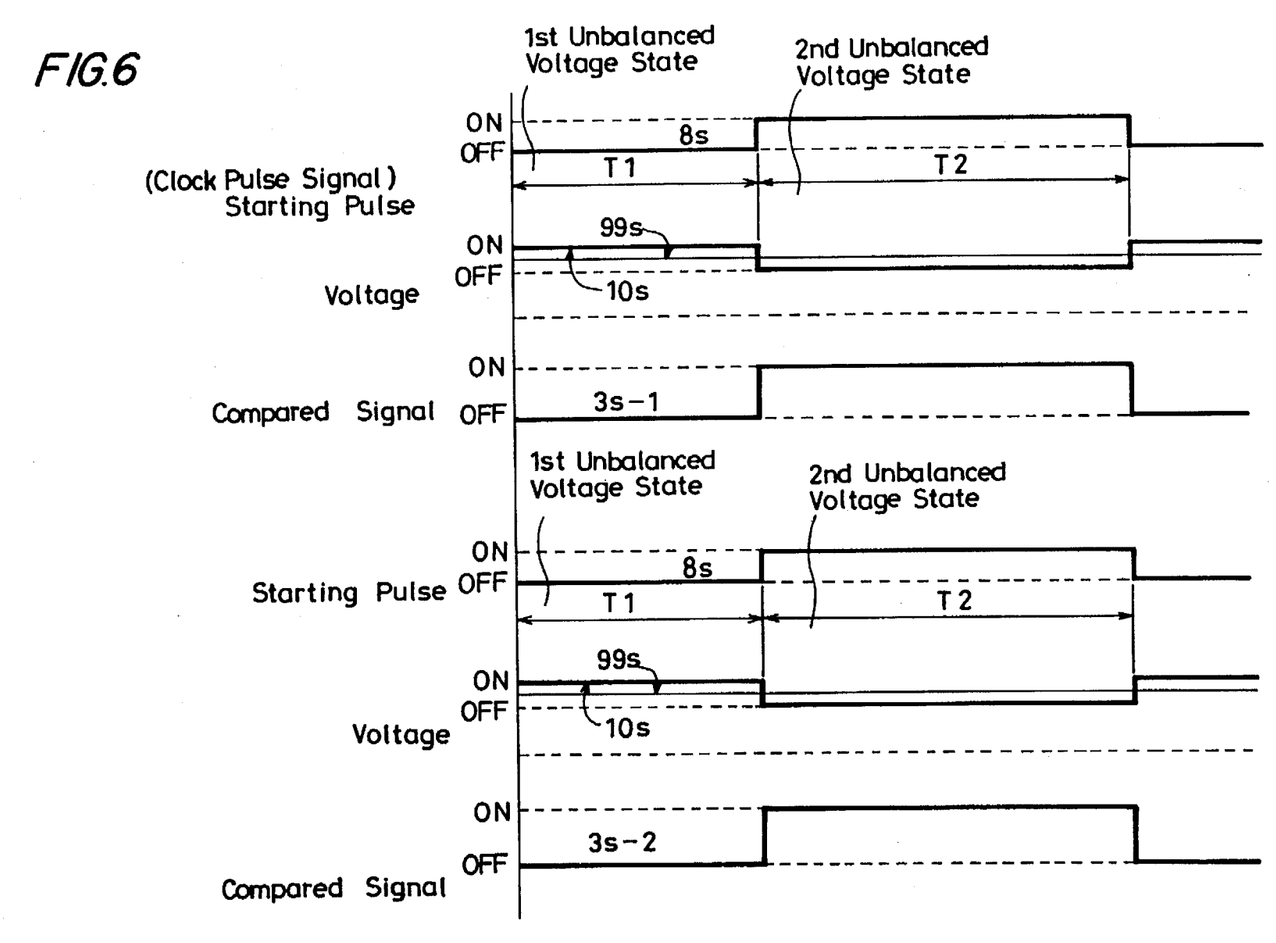
FIG. 6 is a diagram to which reference will be made in explaining changes between a first unbalanced voltage state and a second unbalanced voltage state.

An example of the first and second unbalanced voltage states (including the voltages 10s and 99s) and a relationship between such states and the compared signals 3s-1 and 3s-2 is illustrated in FIG. 6. In FIG. 6, T1 denotes the first unbalanced voltage state, and T2 denotes the second unbalanced voltage state. As shown therein, when the first unbalanced voltage state T1 is changed or switched to the second unbalanced voltage state T2, the compared signal 3s-1 is changed from a relatively low value or off-state to a relatively high value or on-state and supplied from the comparator 112. Similarly, when the first unbalanced voltage state T1 is switched to the second unbalanced voltage state T2, the compared signal 3s-2 is changed from a relatively low value or off-state to a relatively high value or on-state and supplied from the comparator 112.

The signal flow utilized in supplying a driving current to the driving coils 1, 2 so as to excite such driving coils will now be described below.

The compared signals 3s-1, 3s-2 are supplied through the selector 4 (FIG. 1) during a period in which the mask signal 11s from the mask signal generating circuit 11 (FIG. 1) is held in a relatively low or off-state. Data obtained immediately before the mask signal 11s is placed in an on-state may be latched by the selector 4 and outputted as selected data signals 4s-1 and 4s-2 to the switching circuit 5. The switching circuit 5 latches the received selected data signals 4s-1 and 4s-2 at a timing corresponding to the latch delay pulse 9s supplied thereto from the latch delay circuit 9 so as to form switching output signals 5s-1 and 5s-2. In other words, the switching circuit 5 latches the selected data signals 4s-1 and 4s-2 with a delay time of 3 clock pulses from the differentiation pulse 7s (see FIGS. 5F, 5G, 5H and 5J). The switching output signals 5s-1 and 5s-2 from the switching circuit 5 are supplied to the decoder 12 which may include a logic circuit (not shown). The decoder 12 decodes the switching output signals 5s-1 and 5s-2 in accordance with an excitation code based on the logic circuit so as to form decoded or excitation switching signals 13s-1 through 13s-4 which are supplied to the driver 6 circuit. In response to such switching signals, the driver circuit 6 effects a 2-phase switching (switching of the excitation pattern) by switching on the appropriate transistor(s) so as to excite the driving coils 1, 2.

Thus, most of the data flow utilized to excite the driving coils 1, 2 may be controlled in the brushless sensorless motor driving circuit 100 on the basis of the clock pulse signal 8s generated by the PLL circuit 8.

Operations of the brushless sensorless motor driving circuit 100 shown in FIG. 1 for two situations will now be described.

(1) In the situation wherein the rotor R is rotated when the brushless sensorless motor driving circuit 100 is excited When the rotor R (FIG. 1) is rotated by exciting the brushless sensorless motor driving circuit 100, a driving current may be supplied to any one of the two driving coils 1, 2. Upon supplying the driving current to any one of the driving coils 1, 2, the rotor R may be attracted by a magnetic force generated by the respective driving coil excited with the driving current supplied thereto (such as driving coil 1) and, as a result, the rotor R may be slightly rotated. The detector 3 may then detect the induced voltages (counterelectromotive force) generated in the driving coil 1.

Upon detecting the counterelectromotive forces, the detecting circuit 3 (FIG. 1) supplies the compared signals 3s-1, 3s-2 (FIGS. 5B and 5C) to the selector 4 and the differentiating circuit 7. In accordance with the received compared signals 3s-1, 3s-2, the selector circuit 4 generates the selected data signals 4s-1, 4s-2 (FIGS. 5D and 5E) and the differentiating circuit 7 generates the differentiation pulse 7s (FIG. 5F). Such differentiation pulse 7s is supplied to the PLL circuit 8, the latch circuit 9 and the mask signal generating circuit 11.

The PLL circuit 8 may generate a clock pulse signal 8s with a relatively low frequency. That is, before the differentiation pulse 7s is supplied to the PLL circuit 8, the VCO 44 of the PLL circuit may generate a clock pulse signal 8s with such low frequency.

The PLL circuit 8 may constantly generate a clock pulse signal 8s at a rate which is 16 times that of the differentiation pulse 7s. Furthermore, the PLL circuit 8 may constantly switch the phase of the clock pulse signal 8s with a delay time of three clock pulses from the differentiation pulse 7s and may constantly switch the phase with a constant delay interval from the zero-crossing point ZC regardless of the rotational speed of the rotor R.

The PLL circuit 8 supplies the clock pulse signal 8s to the two switching circuits 90, 90 (FIG. 2), the latch delay circuit 9, and the mask signal generating circuit 11.

The latch delay circuit 9 and the mask signal generating circuit 11 operate in accordance with the clock pulse signal and the differentiation pulse 7s supplied thereto from the differentiating circuit 7.

That is, the latch delay circuit 9 generates the latch delay pulse 9s (FIG. 5J) and supplies the same to the switching circuit 5. In response to the latch delay pulse 9s, the switching circuit 5 latches the selected data signals 4s-1, 4s-2 (FIGS. 5D and 5E) with a delay time corresponding to a predetermined number of clock pulses, for example, two clock pulses from the differentiation pulse 7s, so as to form switching output signals 5s-1 and 5s-2. The phase of the switching output signals 5s-1 and 5s-2 may be switched in accordance with the selected data signals 4s-1, 4s-2 and the latch delay pulse 9s. Such output signals are supplied to the decoder 12, whereupon the excitation switching signals 13s-1 through 13s-4 are formed. As a result, the driving coils 1, 2 are excited, thereby causing the rotor R to rotate.

The above operation may be repeated when the rotor R begins to rotate, whereupon the rotor R may be rotated at an increased rotational speed. Simultaneously, the timing at which the counterelectromotive force crosses the zero-crossing point ZC (shown in FIG. 3) may quicken or increase and, as such, the interval between adjacent differentiation pulses 7s may be reduced.

Thus, the brushless sensorless motor driving circuit 100 utilizes the PLL circuit 8 for inputting the counterelectromotive forces (induced voltages) of the driving or excitation coils 1, 2. The latch delay circuit 9 may delay the position of the rotor R by a predetermined delay amount from the reference position by forming a phase-shift (a phase delay) on the basis of the clock pulse signal 8s supplied thereto from the PLL circuit 8.

The mask signal generating circuit 11 eliminates an undesirable flyback voltage (FIG. 3) by use of the mask period T (FIG. 5i) so that the driving coils 1, 2 may be constantly excited under an optimum condition regardless of the change of the rotational speed of the rotor R of the brushless sensorless motor 120 (FIG. 1).

(2) In the situation wherein the rotor R is already placed in a neutral position so that the rotor R is in a stationary state when excited, and the rotor R does not begin to rotate in a starting mode If the rotor R is placed in a stationary position or state due to a magnetic force from the driving coils 1, 2, the rotor R may not be energized and counterelectromotive forces 6s-1, 6s-2, 6s-3 and 6s-4 may not be generated even after driving currents have been supplied to the driving coils 1, 2. Even when the rotor R is in a stationary state (regardless of whether the driving coils 1, 2 are excited), the PLL circuit 8 generates the clock pulse signal 8s (which may have the afore-mentioned low frequency) and may supply the same to the latch delay circuit 9 and the mask signal generating circuit 11. Additionally, the clock pulse signal 8s may or may not be supplied to the switching circuits 90, 90 of the detecting circuit 3. Both of these latter situations and the effects therefrom are described hereinbelow.

When the rotor R is in a stationary state and the switching circuit 90 is not supplied with the clock pulse signal 8s, the switching circuit is placed in the inactive state. As a result, the voltage 10s of the unbalanced voltage supplying unit 80 may have a value or level slightly higher than that of the voltage 99s. Such situation is the first unbalanced voltage state T1 shown in FIG. 6.

On the other hand, when the brushless sensorless motor driving circuit 100 is placed in the starting mode by activating a switch (not shown), the clock pulse signal 8s is inputted to the switching circuit 90 and, as such, the switching circuit is placed in the active state. As a result, the voltage 10s of the unbalanced voltage supplying unit 80 may have a value or level lower than that of the voltage 99s, thereby causing the first unbalanced voltage state T1 to be switched to the second unbalanced voltage state T2 as, for example, shown in FIG. 6.

The compared signals 3s-1, 3s-2 are supplied to the selector 4 (FIG. 1) and are allowed to pass therethrough during a period in which the mask signal 11s from the mask signal generating circuit 11 (FIG. 1) is in its off-state. Data obtained immediately before the mask signal 11s is in its on-state are latched while the mask signal 11s is in its on-state and outputted as the selected data signals 4s-1, 4s-2 to the switching circuit 5 which, in turn, latches the selected data signals in accordance with the latch delay pulse 9s. (As previously described, such latching may have a delay time associated therewith which corresponds to three clock pulses from the differentiation pulse 7s.) The switching output signals 5s-1, 5s-2 from the switching circuit 5 are supplied to the decoder 12 so as to be decoded, in the manner previously described, and supplied to the driver circuit 6. Output signals from the driver circuit 6 are utilized to excite the driving coils 1, 2. That is, the driver circuit 6 may switch the phase of the excitation pattern by causing the appropriate one(s) of the transistors Tr1 to Tr8 (FIG. 8) to be switched on, in a manner similar to that previously described.

The manner in which the starting mode of the rotor R may be switched to the driving mode thereof will now be described.

When the rotor R is switched from the starting mode to the driving mode, unbalanced voltages 10s and 99s (FIG. 2) may be superimposed upon the counterelectromotive forces 6s-1 through 6s-4 generated when the rotor R is rotated. However, since such counterelectromotive forces may have voltage values much larger than the unbalanced voltages 10s and 99s, superimposing the unbalanced voltages upon the counterelectromotive forces may not produce any adverse effects and, in fact, may have a similar effect to that of noise. Accordingly, since the voltages 10s and 99s have negligibly small values as compared with the counterelectromotive forces, the starting mode of the rotor R may be smoothly switched to the rotor driving mode. In other words, at a time wherein counterelectromotive forces are generated, the rotor R of the brushless sensorless motor 120 may be smoothly switched from the starting mode to the rotor rotating mode without being disturbed by the voltages 10s and 99s of the starting pulse inserting circuits 70.

Further, the energization of the rotor R in the driving circuit of FIG. 7 is controlled digitally, whereas such control is performed in an analog fashion in the present brushless sensorless motor driving circuit. That is, in the present brushless sensorless motor driving circuit, the starting pulse inserting circuits 70 may be formed of a resistor-bridge circuit having a plurality of resistors and the switching circuit 90 (or transistor) as previously described and as shown in FIG. 2. As such, a switching function based on a digital circuit or a special frequency-dividing circuit or the like may not be needed, unlike in the driving circuit of FIG. 7. For example, in the brushless sensorless motor driving circuit of FIG. 7, a first frequency-divider which may be included in the PLL 206 has to be reset when counterelectromotive forces are detected. Such resetting requires an extra reset frequency-divider or special frequency-divider in addition to the first frequency-divider. On the other hand, in the present driving circuit, the frequency-divide circuit 46 of the PLL circuit 8 is utilized to form the clock pulse signal 8s which is supplied to the switching circuit 90 of the starting pulse inserting circuit 70 and such frequency-divide circuit may also be utilized to generate the starting pulse for turning on and off the switching circuit 90. As an example, consider the situation in which a divide-by-128 circuit is needed to generate a starting pulse and the PLL circuit 8 needs a divide-by-16 circuit. In this situation, the divide-by-128 circuit may contain seven flip-flops and the divide-by-16 circuit may contain four flip-flops. However, since the frequency-divide circuit 46 also generates the starting pulse, only seven flip-flops are needed. Thus, the present invention enables a reduction in circuitry, thereby reducing the cost associated therewith.

Thus, the present invention provides a brushless sensorless motor driving circuit which has numerous advantages over other driving circuits including that of FIG. 7. Several of these advantages are summarized below.

First, by utilizing the mask signal generating circuit 11, the present invention may eliminate a spike voltage (flyback voltage) which may be generated when the excitation of the driving coils 1, 2 is switched. In particular, the mask signal generating circuit may mask the spike voltage during the period wherein the spike voltage is generated. As a result, an erroneous detection of a zero-crossing point caused by the spike voltage may be prevented.

Second, the starting mode of the rotor R may be smoothly switched to the rotor driving mode and fluctuations in the starting times may be reduced.

Third, it may not be necessary to set the conditions under which the motor starting mode is switched to the normal driving mode.

Fourth, since the unbalanced voltages 10s, 99s of the unbalanced voltage supplying unit 80 in the starting pulse inserting circuit 70 act as offsets on the input side of the comparator 112, the occurrence of a so-called beat lock in the comparator may be avoided.

Fifth, the present motor driving circuit has a relatively simple arrangement, as previously described. Accordingly, the costs associated with the fabrication and operation thereof may be reduced or minimized. Further, such simplified design enables the present driving circuit to be applied to a wide variety of motors.

Although in describing the above preferred embodiment of the present invention, specific features and/or elements were described, the present invention is not so limited. For example, the brushless sensorless motor driving circuit according to the present invention is not limited to use with a 2-phase brushless sensorless motor, but may be utilized with a 3-phase or other type of brushless sensorless motor. Further, the motor does not have to be a coreless motor or an iron-core motor, but may be a permanent magnet (PM) type stepping motor or a hybrid (HB) type stepping motor or other type of motor.

Although a preferred embodiment of the present invention and modifications thereof have been described in detail herein, it is to be understood that this invention is not limited to this embodiment and modifications, and that other modifications and variations may be affected by one skilled in the art without departing from the spirit and scope of the invention as defined by the appended claims.

What is claimed is:

1. A sensorless motor driving circuit for driving a motor having a rotatable rotor and a plurality of excitation coils, said driving circuit comprising:

detection means for detecting a reference position of said rotor based on induction voltage of said excitation coils;

a phase-locked loop circuit for generating a clock pulse;

delay pulse generating means for generating a delay pulse based on said clock pulse;

switching signal generating means for generating conduction switching signals for said excitation coils from an output signal of said detection means based on the timing of said delay pulse from said delay pulse generating means;

a driver circuit for causing conduction in said excitation coils based on said conduction switching signals; and wherein said detection means having starting pulse inserting circuits for inserting a starting pulse based on said clock pulse when said induction voltage is not generated from said plurality of excitation coils.

2. A sensorless motor driving circuit according to claim 1, wherein said detection means includes comparing circuits coupled to said plurality of excitation coils for comparing each induction voltage of said excitation coils.

3. A sensorless motor driving circuit according to claim 2, wherein said starting pulse inserting circuits are coupled to said comparing circuits.

4. A sensorless motor driving circuit according to claim 2, wherein said starting pulse inserting circuits include switching means operative for being placed in one of an active state and an inactive state in response to said clock pulse supplied thereto from said phase-locked loop circuit, and wherein said starting pulse inserting circuits further include an unbalanced voltage supplying unit responsive to said switching means and coupled to said comparing circuits at a portion thereof which is connected to said plurality of excitation coils for supplying a first unbalanced voltage to said comparing circuits when said switching means is placed in said inactive state and for supplying a second unbalanced voltage to said comparing circuits when said switching means is placed in said active state.

5. A sensorless motor driving circuit according to claim 4, wherein said unbalanced voltage supplying unit includes a plurality of resistors.

6. A sensorless motor driving circuit according to claim 1, further comprising a differentiation pulse generating means for generating a differentiation pulse from an output signal of said detection means.

7. A sensorless motor driving circuit according to claim 6, wherein said phase-locked loop circuit includes a frequency dividing circuit for frequency dividing said clock pulse and a phase comparator for comparing said differentiation pulse with the frequency divided pulse.

8. A sensorless motor driving circuit according to claim 1, further comprising mask signal generating means for generating a mask signal for suppressing a pulse which may be generated when conduction of said excitation coils is switched.

9. A sensorless motor driving circuit according to claim 1, wherein said motor is a 2-phase bi-directional sensorless motor which rotates a drum of a rotary magnetic head apparatus.

10. A sensorless motor driving circuit according to claim 1, wherein said motor is a 2-phase bi-directional sensorless motor which rotates an optical disk.

11. A sensorless motor driving circuit for driving a motor having a rotatable rotor and a plurality of excitation coils, said driving circuit comprising:

detection means for detecting a reference position of said rotor based on induction joltages of said excitation coils, said detection means having comparing circuits coupled to said plurality of excitation coils for comparing each induction voltage;

a differentiation pulse generating means for generating a differentiation pulse from an output signal of said detection means;

a phase-locked loop circuit for generating a clock pulse, said phase-locked loop circuit having a frequency dividing circuit for frequency dividing said clock pulse and a phase comparator for comparing said differentiation pulse and the frequency divided pulse;

a delay circuit for generating a delay pulse in accordance with said clock pulse;

switching signal generating means for generating conduction switching signals for said excitation coils based on said delay pulse from said delay circuit;

a driver circuit for causing conduction in said excitation coils based on said conduction switching signals; and starting pulse inserting circuits for inserting a starting pulse based on said clock pulse into said comparing circuits when said induction voltage is not generated from said plurality of excitation coils.

12. A sensorless motor driving circuit according to claim 11, wherein said starting pulse inserting circuits include switching means operative for being placed in one of an active state and an inactive state in response to said clock pulse supplied thereto from said phase-locked loop circuit, and wherein said starting pulse inserting circuits further include an unbalanced voltage supplying unit responsive to said switching means and coupled to said comparing circuits at a portion thereof which is connected to said plurality of excitation coils for supplying a first unbalanced voltage to said comparing circuits when said switching means is placed in said inactive state and for supplying a second unbalanced voltage to said comparing circuits when said switching means is placed in said active state.

13. A sensorless motor driving circuit according to claim 12, wherein said unbalanced voltage supplying unit includes a plurality of resistors.

14. A sensorless motor driving circuit according to claim 11, further comprising mask signal generating means for generating a mask signal for suppressing a pulse which may be generated when conduction of said excitation coils is switched.

15. A sensorless motor driving circuit according to claim 11, wherein said motor is a 2-phase bi-directional sensorless motor which rotates a drum of a rotary magnetic head apparatus.

16. A sensorless motor driving circuit according to claim 11, wherein said motor is a 2-phase bi-directional sensorless motor which rotates an optical disk.

17. A sensorless motor driving circuit for driving a motor having a rotatable rotor and at least one excitation coil, said driving circuit comprising:

detection means for detecting a generated induction voltage from said at least one excitation coil and for producing an output signal in accordance therewith;

a phase-locked loop circuit for generating a clock pulse;

delay pulse generating means for generating a delay pulse based on said clock pulse;

switching signal generating means for generating conduction switching signals in accordance with said output signal and said delay pulse for causing an excitation pattern of said at least one excitation coil to be switched to another excitation pattern; and wherein said detection means having starting pulse inserting circuits for inserting a starting pulse based on said clock pulse when said induction voltage is not generated.

* * * * *